Jan. 17, 1967  A. F. HICKMAN  3,298,711
HEAVY DUTY VEHICLE SPRING SUSPENSION
Filed Sept. 3, 1965  11 Sheets-Sheet 9

INVENTOR.
Albert F. Hickman
BY
Popp and Sommer
ATTORNEYS.

Jan. 17, 1967  A. F. HICKMAN  3,298,711
HEAVY DUTY VEHICLE SPRING SUSPENSION
Filed Sept. 3, 1965  11 Sheets-Sheet 11

INVENTOR.
Albert F. Hickman
BY
Popp and Sommer
ATTORNEYS.

United States Patent Office 3,298,711
Patented Jan. 17, 1967

3,298,711
HEAVY DUTY VEHICLE SPRING SUSPENSION
Albert F. Hickman, 8009 N. State Road,
Eden, N.Y. 14057
Filed Sept. 3, 1965, Ser. No. 484,849
9 Claims. (Cl. 280—124)

This application is a continuation-in-part of my copending application for independent wheel torsion bar vehicle suspension Serial No. 424,293, filed January 8, 1965.

This invention relates to a heavy duty vehicle spring suspension, such as for highway and off-the-road heavy duty service, and more particularly to such a heavy duty suspension in which each wheel is capable of vertical movement independently of the other wheels supporting the vehicle frame. For the purpose of the application the designation of a wheel is meant to include both a single tire wheel and also a so-called dual tire wheel, that is, a wheel composed of two rim structures bolted together, side-by-side and each having a rubber tire. The present invention can be adapted to single independent wheels supporting opposite sides of the rear end of a heavy duty vehicle frame; a pair of independent wheels in tandem supporting each side of the rear end of such a vehicle frame; or a group of three or more independent wheels in tandem so supporting each side of the rear end of a vehicle frame. The present invention is more particularly directed to such a suspension in which a torsion spring means is interposed between and resiliently supports the vehicle frame on each wheel. The tandem wheel forms of the invention are further characterized by load transfer at each side of the vehicle frame from one tandem wheel to another through their individual torsion springs so that these torsion springs are additive in providing a resilient support for the vehicle frame.

In common with this earlier application, general objects of the present invention are to provide such a suspension which is free from friction but is controlled by an increased resistance to motion in proportion to the amplitude and velocity of vertical main frame movement; which consists of compact components which are arranged so as not to interfere with frame and wheel movement and in which the vertical moving parts are arranged inside and close to the wheels and provide high and wide support for the vehicle frame on the stub axles with resulting increased stability; which can have softer springs than those now on the market for equivalent duty and at the same time have greater sidesway control through high and wide spring mountings; which can have many years and hundreds of thousands of miles of carefree operation; in which substantially all bearings, other than the wheel bearings, can be in the form of rubber bodies distorted to provide the required movement and being free from friction and lubrication or other service requirements; which is light in weight, particularly in unsprung weight; which is low in both initial cost and upkeep; which renders auxiliary devices for the control of sidesway unnecessary; and in which periodic vibration of the suspension is dampened out.

An important specific object of the present invention is to provide such an independent wheel suspension which is adapted for very heavy duty highway and off the road service and can be adapted to single wheels supporting opposite sides of the vehicle frame or two, or three or more independent wheels in tandem at each side of the vehicle frame.

Another specific object of the invention is, in such tandem wheel suspensions, to provide load transfer between or among the tandem wheels at each side of the vehicle frame so that an excess load on any one wheel is transmitted to its companion tandem wheel or wheels on the same side of the vehicle frame.

Another specific object of the invention is to provide such a tandem independent wheel suspension in which the action of the several torsion spring means or torsion bars of each group of tandem wheels on one side of the vehicle frame is cumulative so as to contribute jointly to a softer and low frequency ride.

Another most important specific object of the present invention is to provide such a suspension in which the majority of components from a single wheel suspension, two tandem wheel suspension, extended wheel base two tandem wheel suspension and a three or more tandem wheel suspension can all be made identical and have identical connections with one another and the vehicle frame, the various types of suspensions differing essentially in minor equalizing connections where the invention is embodied in a tandem wheel suspension.

Another important object of the invention is to provide, in a tandem wheel suspension, a simple and effective means for rendering the wheels self-steering so as to avoid tire scuff in steering the vehicle around a curve or into and out of traffic.

Other objects and advantages of the invention will be apparent from the following description and drawings in which.

*The vehicle frame, all figures*

The main frame 25 of the vehicle can be of any suitable construction and is shown as comprising a pair of main longitudinal side frame bars 26, these main longitudinal side frame bars being in the form of inwardly facing channels which are shown as straight and parallel and are connected near their rear ends by one or more cross bars shown as being in the form of upwardly facing channels 28, and at extreme rear ends of the main longitudinal side frame bars by a rear cross bar 29 in the form of a channel facing the forward end of the vehicle.

*Two tandem wheel axle suspension, FIGURES 1–8*

Figure 3:
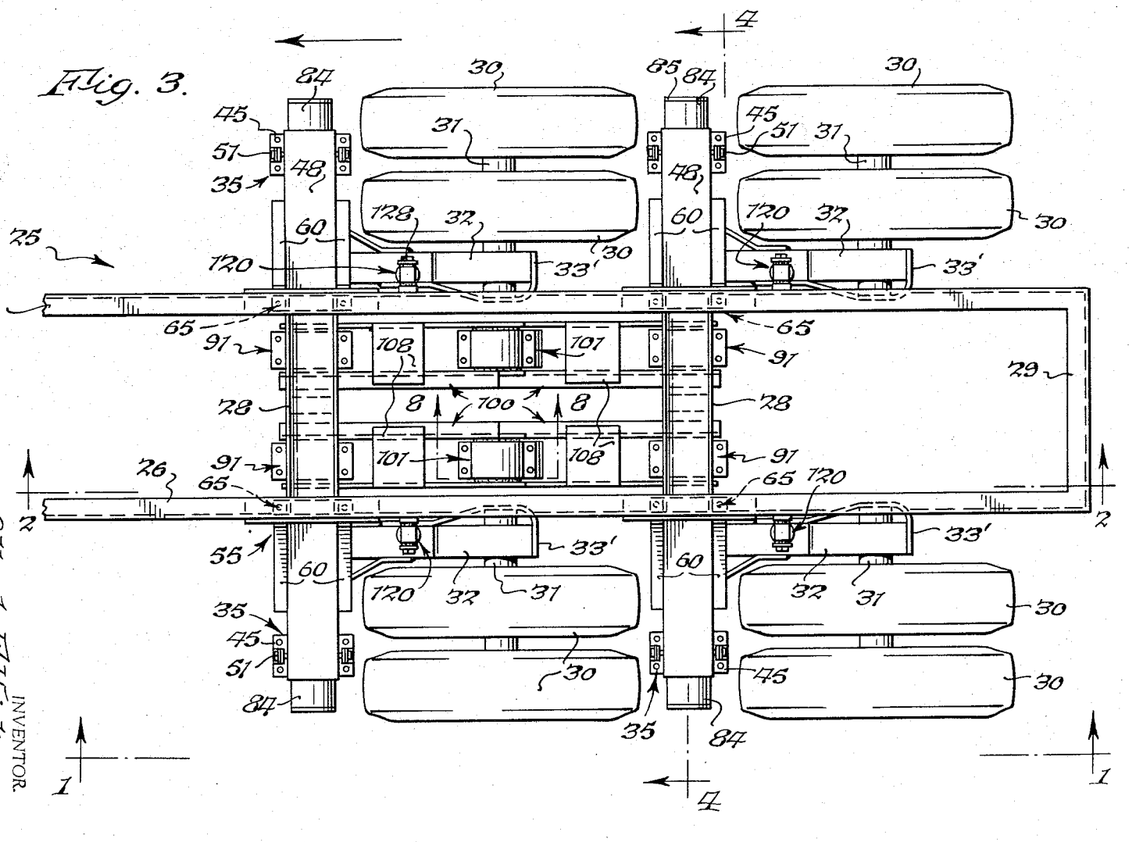
FIG. 3 is a fragmentary top plan view of the rear end of the two tandem wheel vehicle frame and suspension shown in FIGS. 1 and 2.

As with the other forms of the invention, the frame 25 is shown as supported by dual tire wheels 30, these wheels being shown in the form of dual tire wheels, that is in pairs of rim structures bolted together side-by-side and each pair of rim structures being journalled on a stub axle 31 in any suitable manner (not shown), these stub axles extending horizontally transversely of the line of movement of the vehicle and the stub axles 31 at opposite sides of the vehicle being arranged axially in line with each other as best shown in FIG. 3. Each stub axle 31 is welded or otherwise fixed to the free end of an arm indicated generally at 32 which can be of any suitable form but is shown as being of rectangular tubular form in cross section with the stub axle 31 extending through and being welded to its outboard end, the stub also being welded to a reinforcing strap 33 welded to the arm 32 and providing an offset to which the inner extremity of the stub axle 31 is welded. The inboard end of each arm 32 is welded to a horizontal cross shaft 33. This cross shaft is in the form of a tubular cross shaft extending transversely of the line of movement of the vehicle frame and being arranged parallel with its stub axle 31 and the axis of its wheel 30.

Figure 4:
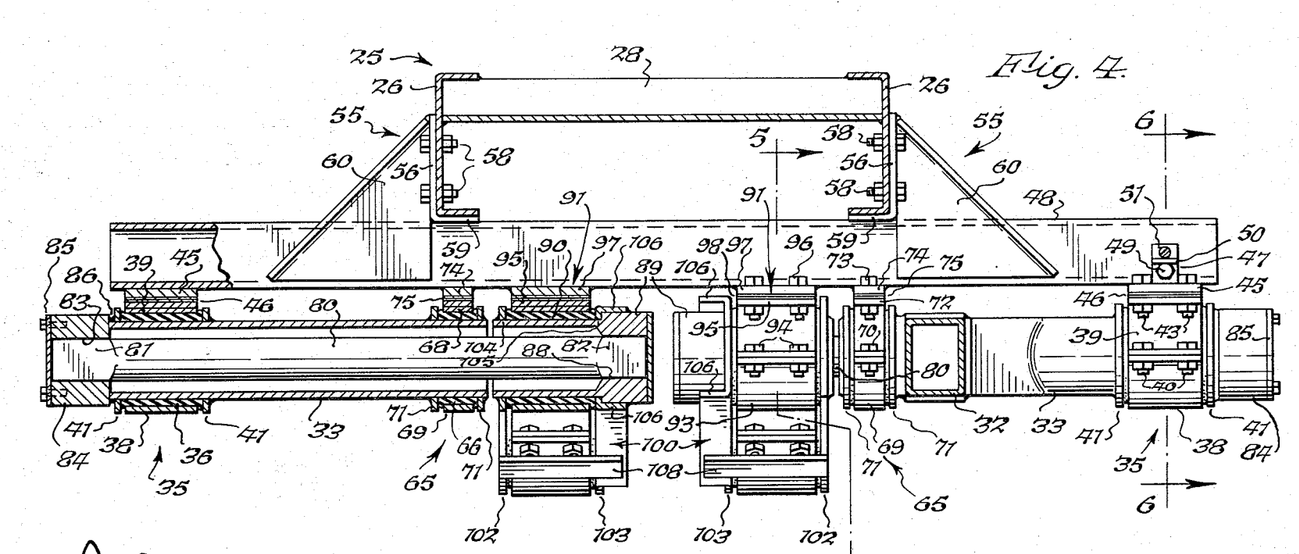
FIG. 4 is an enlarged vertical transverse section taken generally on line 4—4, FIG. 3, parts being shown in elevation.
Figure 6:
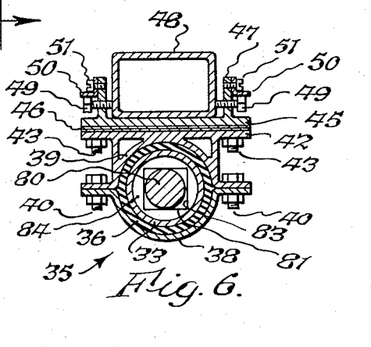

The outer end of each tubular cross shaft 33 is journalled in a bearing 35 which is preferably in the form of a rubber bushed bearing. As best shown in FIGS. 4 and 6 each of these bearings 35 is shown as comprising a rubber bushing 36 surrounding and held in compressive relation with the outboard end of its tubular cross shaft 33 by a lower half bearing housing 38 and an upper half bearing housing 39, these half bearing housings being drawn together into compressive relation with their rubber bushing by bolts 40. The ends of the rubber bushings 36 protrude beyond the upper and lower half bearing housings 38, 39 and abut against rings 41 welded to the companion tubular cross shaft 33, as best shown in FIG. 4.

Each upper half bearing housing 39 is provided with a horizontal top plate 42 which is bolted, as by bolts 43, to the underface of a horizontal adjustment plate 45, one or more shims 46 being interposed between these plates 42, 40, 45, for adjustment purposes as hereinafter described. Each adjustment plate 45 is shown as provided with a pair of upstanding ears 47 which straddle one end of a tubular cross bolster 48, of rectangular form in cross section. Each cross bolster 48 extends under both main longitudinal side bars 26 of the vehicle frame 25 and at its opposite ends rests on the companion pair of adjustable plates 45 as best shown in FIGS. 4 and 6. Any suitable means can be provided for adjusting the adjusting plates 45 fore-and-aft with reference to the line of movement of the vehicle. For this purpose, opposing adjusting screws 49 are shown as threadedly secured in these ears 47 the inner opposing ends of these screws engaging the side walls of the tubular cross bolster 48 so that by adjustment of these screws 49 each adjustable top plate 45 and the bearing 35 can be brought to different positions with reference to the bolster 48, fore-and-aft with reference to the line of movement of the vehicle. The shims are for adjustment of camber and these screws 49 are for adjustment of wheel alinement. The adjustment of each screw 49 can be maintained by the small L-shaped retainer 50 secured to each ear 47 by a small screw 51.

Figures 7, 8:
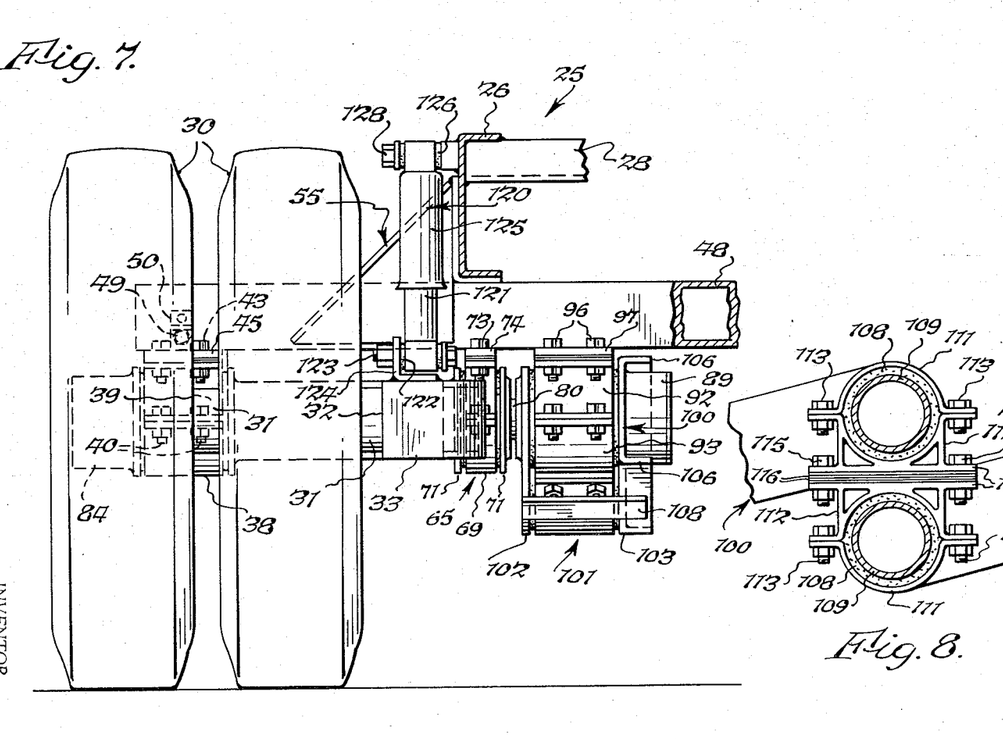
FIG. 7 is an enlarged vertical fragmentary vertical transverse section taken generally on line 7—7, FIG. 3.
FIG. 8 is a vertical longitudinal section taken generally on line 8—8, FIG. 3.

In the form of the invention shown in FIGS. 1–8 each end of the cross bolster 48 is secured directly to the corresponding main longitudinal side frame beam 26 by a frame bracket 55. This frame bracket comprises a vertical plate 56 arranged in face-to-face relation to, and secured, as by bolts 58, to each main longitudinal side frame beam 26 and having a flange 59 underlying its main longitudinal frame beam and overlying the cross bolster 48 as best shown in FIGS. 4 and 7. Each frame bracket 55 also is shown as having a pair of depending side plates 60 arranged in face-to-face relation with the opposite side walls of the cross bolster 48 and each preferably provided along its outer edge with a reinforcing flange. In the form of the invention shown in FIGS. 1–8, each pair of vertical side plates 60 is welded to the sides of the cross bolster 48 but it is a feature of other forms of the invention that these frame brackets 55 are supported on the cross bolster 48 in such manner as to permit self-steering of the wheels 30 supporting the opposite ends of the cross bolster 48.

The inner end of each tubular cross shaft 33 is connected to the corresponding cross bolster 48 by a bearing 65 which is also preferably a rubber bushed bearing. As best shown in FIG. 4 each bearing 65 comprises a rubber bushing 66 surrounding and held in compressive relation with the inner end of the corresponding tubular cross shaft 33 by an upper half bearing housing 68 and a lower half bearing housing 69, these half bearing housings being drawn together into compressive relation with the rubber bushing 66 by bolts 70. The opposite ends of each rubber bushing 66 protrudes beyond its half bearing housings 68 and 69 and abuts against rings 71 welded to the inner end of the tubular cross shaft 33 in spaced relation to each other. The upper half bearing housing 68 is provided with a top cross plate 72 which is secured, as by bolts 73, to a bar 74 welded to the underside of the cross bolster 48. If desired, shims 75 can be interposed between each top cross plate 72 and the companion bolster bar 74 for alinement purposes.

The suspension includes a torsion bar 80 housed within each of the tubular cross shafts 33 and each providing the resilient resistance between the corresponding stub axle 31 and the vehicle frame 25. This torsion bar can be of any suitable form but preferably comprises a rod having an out-of-round end head 81 at its outer end, that is, the end remote from the centerline of the vehicle, and an out-of-round head 82 at its inner end, that is, the end adjacent the centerline of the vehicle.

The enlarged out-of-round outer end 81 of each torsion bar 80 is fitted in a correspondingly shaped out-of-round bore 83 of a coupling sleeve 84 which is shown as being of cylindrical form and is welded, as indicated at 86, to the outer end of its tubular cross shaft 33. The out-of-round bore 83 preferably extends completely through the coupling sleeve 84 and is closed at its outer end by a removable cap or disk 85.

The enlarged out-of-round inner end 82 of each torsion bar 80 is fitted in a correspondingly shaped out-of-round bore 88 of a cylindrical socket or hub member 89. Each socket or hub member 89 has a cylindrical periphery on which a rubber bushing 90 of a bearing 91 is compressively secured by an upper half bearing housing 92 and a lower half bearing housing 93 these half bearing housings being drawn together into compressive relation with the rubber bushing 90 by volts 94. The upper half bearing housing 92 is provided with a top cross plate 95 which is secured, as by bolts 96 to a bar 97 welded to the underside of the cross bolster 48. If desired, shims 98 can be interposed between each top cross plate 95 and the companion bolster bar plate 97 for alinement purposes.

Figure 1:
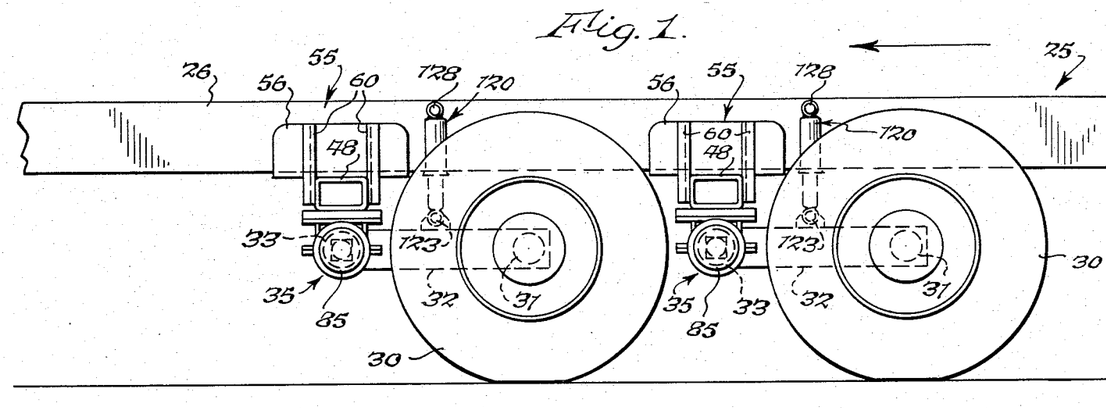
FIG. 1 is a fragmentary side elevational view of the rear end of a vehicle frame in the position of carrying a normal load and supported at each side by a two tandem wheel torsion bar spring suspension embodying the present invention, parts being omitted for the purpose of clarity, this view being taken on line 1—1, FIG. 3. In this and other views the direction of movement of the vehicle is shown by a large overhead arrow.
Figure 2:
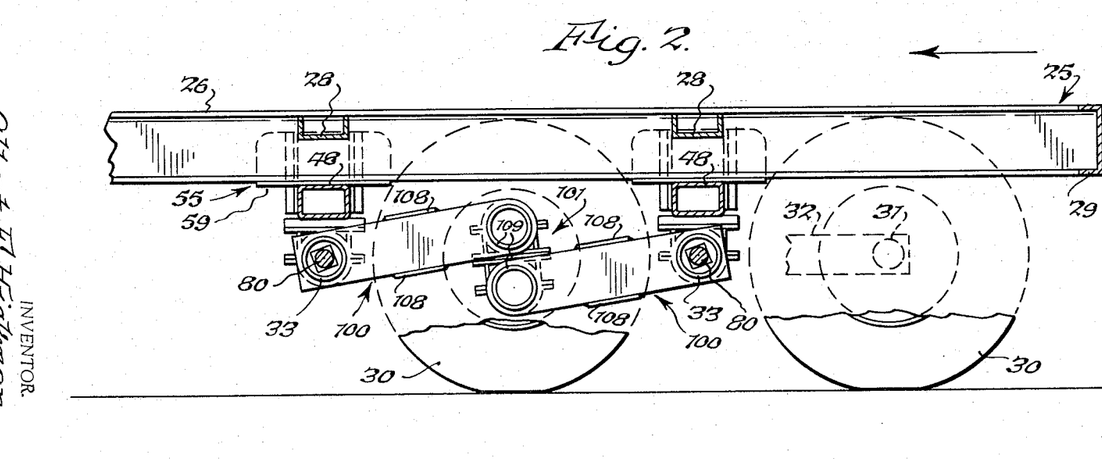
FIG. 2 is a fragmentary longitudinal section thereof taken generally on line 2—2, FIG. 3.

In the two tandem wheel suspension shown in FIGS. 1–8, these socket or hub member 89 form the hubs for compensating arms 100 which extend fore-and-aft with reference to the line of travel of the vehicle, and toward each other, as best shown in FIG. 2, and each is connected at its free end of a companion compensating arm by a shackle 101. Each compensating arm 100 comprises a pair of side plates 102, 103 severally provided with openings 104, 105 by means of which they are fitted around and welded to the opposite ends of their hub 89 as best shown in FIG. 4. For strength, the side plate 103 is preferably flanged along its top and bottom edges as indicated at 106, and at their centers the side plates 102, 103 of each compensating arm 100 are cross connected by plates 108 welded thereto. The outboard end of each compensating arm 100 is provided with openings in which a cylindrical sleeve 109 is fitted and welded, each companion pair of sleeves forming the bearing sleeves for the shackle 101 connecting them.

As best shown in FIG. 8, a rubber bushing 110 embraces each bearing sleeve 109 and is held in compressive relation therewith by an outer half bearing housing 111 and an inner half bearing housing 112 each pair of half bearing housings being drawn together by bolts 113 to compress the corresponding rubber bushing 110. Each inner half bearing housing is provided with a flat plate 114 arranged in opposition to the similar plate of the companion inner half bearing housing 112 and connected together by means of bolts 115 to form each shackle 101. For adjustment purposes one or more shims 116 can be interposed between the plates 114 of each shackle 101 to adjust the opposite sides of the vehicle frame 25 to be level, these shims also being usable to adjust the height from the ground of the entire vehicle frame 25. These shims 116, of course, adjust the effective length of their shackle in so leveling or adjusting the height from the ground of the vehicle frame 25.

Desirably each stub axle 31 is provided with a shock absorber 120 which is shown as being of the telescopic type with its lower telescoping section 121 embracing a rubber bushing 122 on a bolt 123 fixed by a bracket 124 on the corresponding arm 32 and with its upper telescopic section 125 embracing a rubber bushing 126 carried by a bolt 128 projecting from the corresponding main longitudinal side frame beam 26.

*Operation—FIGS. 1–8*

The direction of movement of the vehicle is shown by the large arrows above FIGS. 1, 2 and 3 in the operation of the form of the invention illustrated in FIGS. 1–8 the upward movement of one, say, of the front wheel stub axles 31 effects corresponding angular upward movement of its arm 32 and the tubular cross shaft 33 forming the hub of this arm, such movement being permitted by the rubber bushing 36 and 66 of the bearings 35 and 65 respectively which are located at such points as to prevent cantilever loading of either of these bearings. The bearing 35 is located, for this purpose, in line with its wheel 30, as best shown in FIG. 3. The inner bearing 65 is located, for this purpose, within the area directly below the vehicle frame 25 so as to prevent corner loading of these bearings 35 and 65. It will therefore be seen that the T-arm support for each wheel, provided by the tubular cross shaft 33 and the arm 32 welded thereto, provides stability, the bearings 35, 65 being spaced far enough apart to provide a stable support for the corresponding stub axle 31 and also being so located as to prevent cantilever or corner loading of these bearings.

The angular movement of the tubular cross shaft 33 of the assumed front wheel 30 at one side of the vehicle is transmitted to the tubular extension or coupling sleeve 84 welded to its outer end. The out-of-round bore 83 of this tubular extension or coupling sleeve in turn transmits this movement to the correspondingly shaped enlarged outer end 81 of its torsion bar 80. This bar extends through its tubular cross shaft 33 and its inboard end 82 is anchored in the out-of-round bore 88 of hub 89 of the corresponding compensating arm 100. This hub is journalled in the rubber bushing 90 of its bearing 91 and hence this angular movement of the assumed front wheel hub 89 causes an upward angular movement of its compensating arm 100 thereby, through the corresponding rubber bushed shackle 101, effecting an upward angular movement of the companion compensating arm 100 associated with the companion rear tandem wheel 30. This angular movement is transmitted through the hub 89 of this last rear wheel compensating arm 100 to the inboard end 82 of the corresponding torsion bar 80 and thence through the tubular extension or coupling sleeve 84 welded to the end of the companion tubular cross shaft 33. This imposes a corresponding downward movement of the assumed rear wheel compensating arm 100 and the stub axle 31 of the rear dual tire tandem wheel 30 thereby to provide load transfer, that is, equalized loading between each pair of front and rear dual tire tandem wheels 30 at each side of the vehicle.

It will be particularly noted that this load transfer from one wheel 30 at either side of the vehicle to the opposite side thereof is transmitted through two torsion bars 80 thereby to obtain their cumulative resilence. It will also be noted that by virtue of the long arms 32, which extend beyond the tire treads, these torsion bars 80 can be made short and of large diameter thereby to permit them to be arranged in the coaxial end-to-end relation illustrated in FIG. 4 and extending transversely of the line of movement of the vehicle. It will also be noted that by arranging the outboard bearings 35 between the corresponding pair of tandem wheels 30 not only is there provided a high and wide pivot support for the vehicle frame 25 to provide stability, particularly against sidesway, but also the load imposed on the bearings is directed downwardly so the very small bearing 65 can be used to support the inboard ends of the tubular cross shafts 33.

Figure 9:
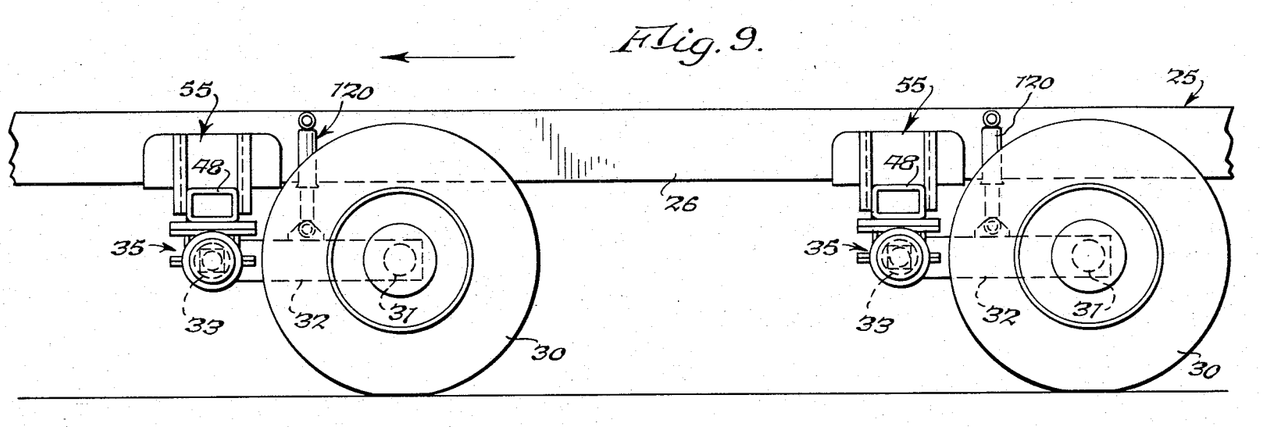
FIG. 9 is a view similar to FIG. 1 showing the manner in which the invention can be applied to a so-called extended wheel base two tandem wheel suspension in which the tandem wheels at each side of the vehicle frame are widely spaced from one another lengthwise of the frame.
Figure 10:
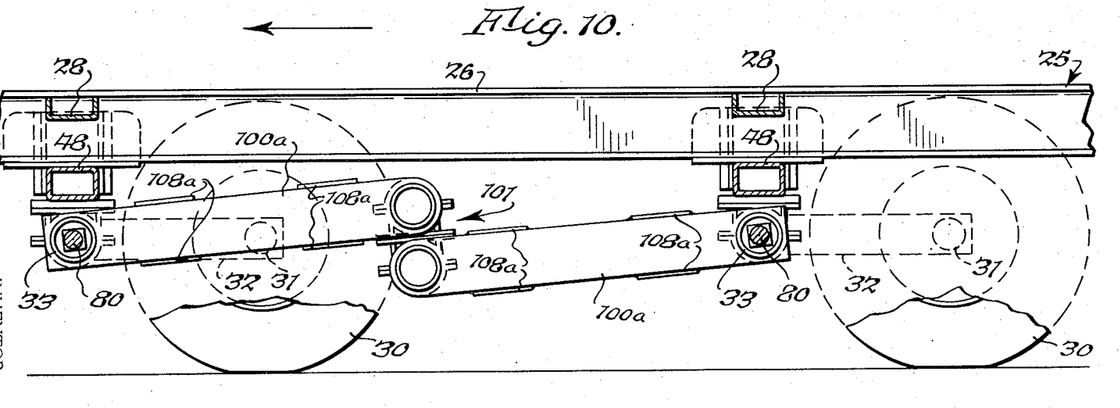
FIG. 10 is a view similar to FIG. 2 but illustrating the invention applied to the extended wheel base two tandem wheel suspension illustrated in FIG. 9.

*Extended wheel base two tandem wheel suspension—FIGS. 9 and 10*

In FIGS. 9 and 10 is illustrated the manner in which the invention can be adapted to a so-called extended wheel base two tandem wheel vehicle suspension, that is, in which the two tandem wheels at each side of the vehicle are spaced more widely from each other, lengthwise of the line of movement of the vehicle than in the usual tandem two wheel suspension. A feature of the extended wheel base two tandem wheel suspension illustrated in FIGS. 9 and 10 is that identical parts can be used for substantially the entire suspension, it being merely necessary to provide longer compensating arms 100a in place of the shorter compensating arms 100 illustrated in FIGS. 1–8. These arms can be of the same construction as the arms 100 except that because of their increased length it is desirable to provide pairs of top and bottom cross plates 108a in place of the single pair of cross plates 108 illustrated in the form of the invention shown in FIGS. 1–8. Since in other respects the form of the invention shown in FIGS. 9 and 10 is identical to the form shown in FIGS. 1–8, a detailed description of the parts and operation of the suspension is not repeated.

*Two tandem wheel axle self-steering suspension—FIGS. 11–15*

In tandem wheel suspensions self-steering is provided by causing one set, on opposite sides of the vehicle frame, of the tandem wheels to track the curved path produced by the front steering wheels and other set of tandem wheels when rounding a curve or in steering in and out of traffic. This is generally accomplished by permitting the self-steering set of wheels, say, the rear set, to move themselves transversely or laterally of the line of movement of the vehicle in response to their frictional resistance to tire scuffing on rounding a curve, and then translating this lateral movement of both wheels of the set into a movement of one of these wheels forwardly and the other wheel rearwardly so that they follow or track the curved line of movement of the vehicle in so rounding a curve or steering in and out of traffic.

To provide self-steering, as illustrated in FIGS. 11–15, the forward bolster 48 is secured directly to the vehicle frame 25 in the same manner as is illustrated in FIGS. 1–8, namely, it is welded to its pair of frame brackets 55 which in turn are secured to the main longitudinal side frame beams 26, as by the bolts 58 as illustrated in FIG. 4.

However, the bolster 48 for the rear pair of tandem wheels 30 is mounted so as to be movable both transversely and lengthwise of the line of movement of the vehicle to permit self-steering. To this end the frame bracket 55a supported by each end of the rear bolster 48, while having the vertical plate 56a arranged in face-to-face relation to, and secured as by bolts 58 to each main longitudinal side frame beam 26, and also having a flange 59a underlying its main longitudinal side frame beam, is provided with a horizontally outwardly projecting base plate 130 reinforced by triangular vertical flanges 131. A horizontal rectilinear movement rubber sandwich 132 is interposed between the bottom plate 130 of each frame bracket 55a and the corresponding end of the rear bolster 46. Each of these sandwiches comprises a horizontal top metal plate 133 and a horizontal bottom metal plate 134 with a body or block 135 of rubber of the required resilience vulcanized to the opposing faces of these plates. This metal top plate 133 is removably secured, as by bolts 136, to the bottom plate 130 of its frame bracket 55a and the metal bottom plate 134 is secured, as by bolts 138, to angle iron side brackets 139 suitably secured to opposite sides of the bolster 46. It will be seen that the resilient rubber bodies 135 permit a resiliently resisted horizontal movement of the rear bolster 46 both laterally and lengthwise of the line of movement of the vehicle while at the same time resiliently returning the bolster 48 to a centered position when lateral forces against the bolster are relieved.

Figure 11:
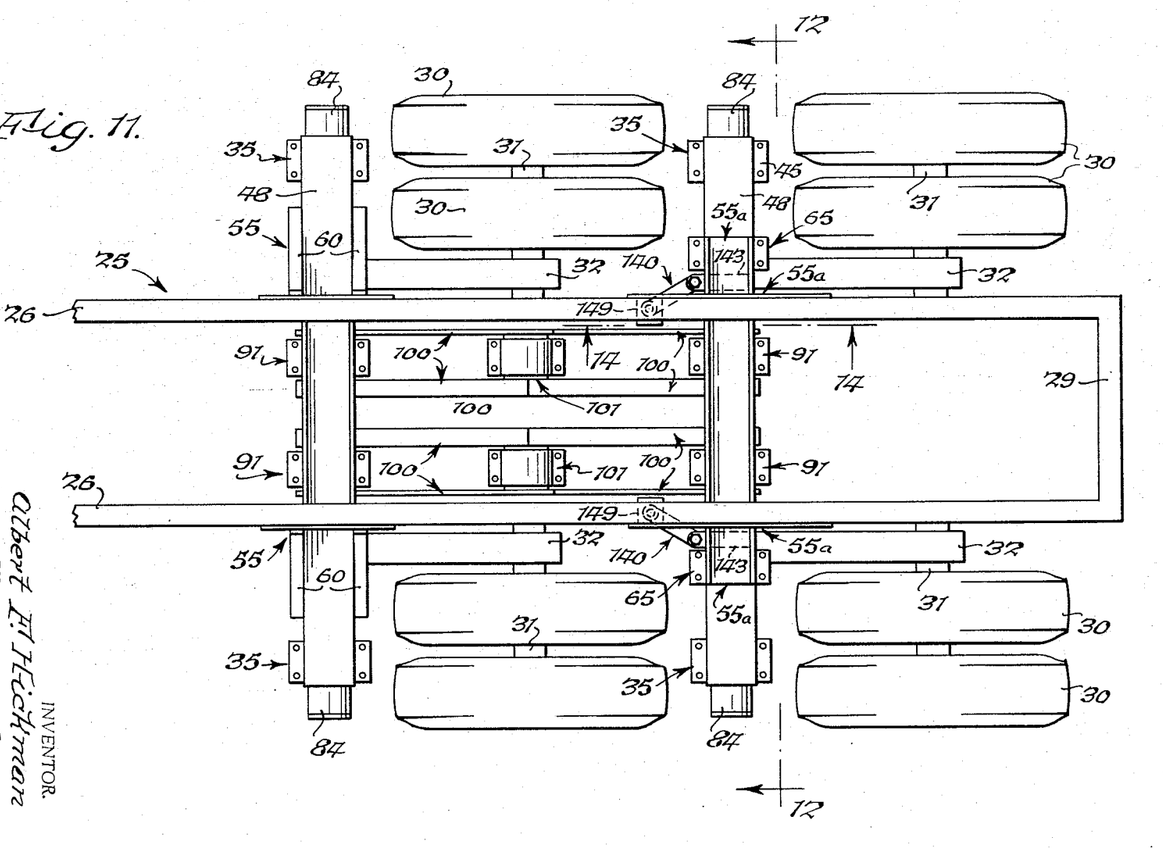
FIG. 11 is a view similar to FIG. 3 but illustrating a modification of the invention in which the two tandem wheel suspension illustrated in FIGS. 1–8 is rendered self-steering in rounding curves on the road or in steering in and out of traffic.

The self-steering is provided by a pair of links 140 at opposite sides of the vehicle and connecting opposite ends of the bolster 46 with the main longitudinal side frame beams 26. Each of these links comprises a vertical tubular hub 141 pivotally connected to the corresponding end of the bolster 46 by means of a pivot pin or bolt 142, this bolt passing through a top plate 143 welded to the top side of the bolster 48 and a bottom plate 144 welded to the underside thereof. These links 140 project forwardly with reference to the line of travel of the vehicle in such manner as to toe-in as illustrated in FIG. 11. The forward end of each of these links 140 is in the form of a socket 146 fitted on a ball 145 at the top end of an upstanding pin 148 mounted on a frame bracket 149.

Figure 12:
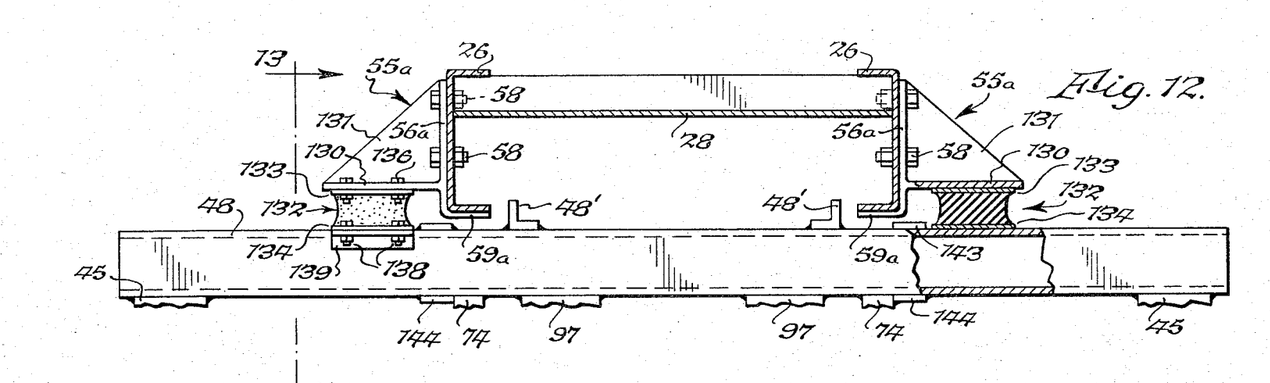
FIG. 12 is an enlarged fragmentary sectional view taken generally on line 12—12, FIG. 11.
Figure 13:
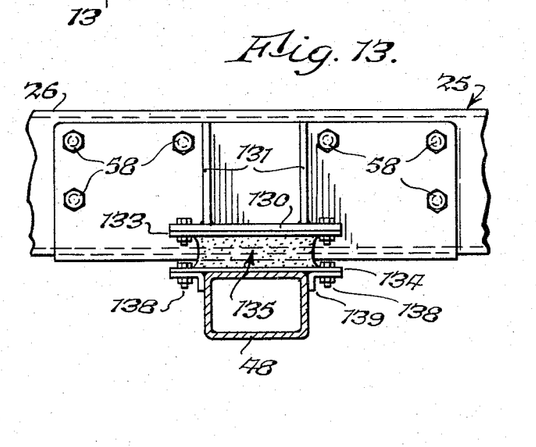
FIG. 13 is a vertical longitudinal section taken generally on line 13—13, FIG. 12.
Figure 14:
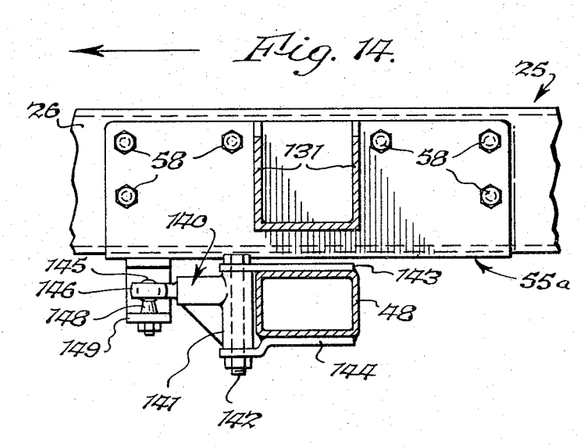
FIG. 14 is an enlarged vertical longitudinal section taken generally on line 14—14, FIG. 11.
Figure 15:
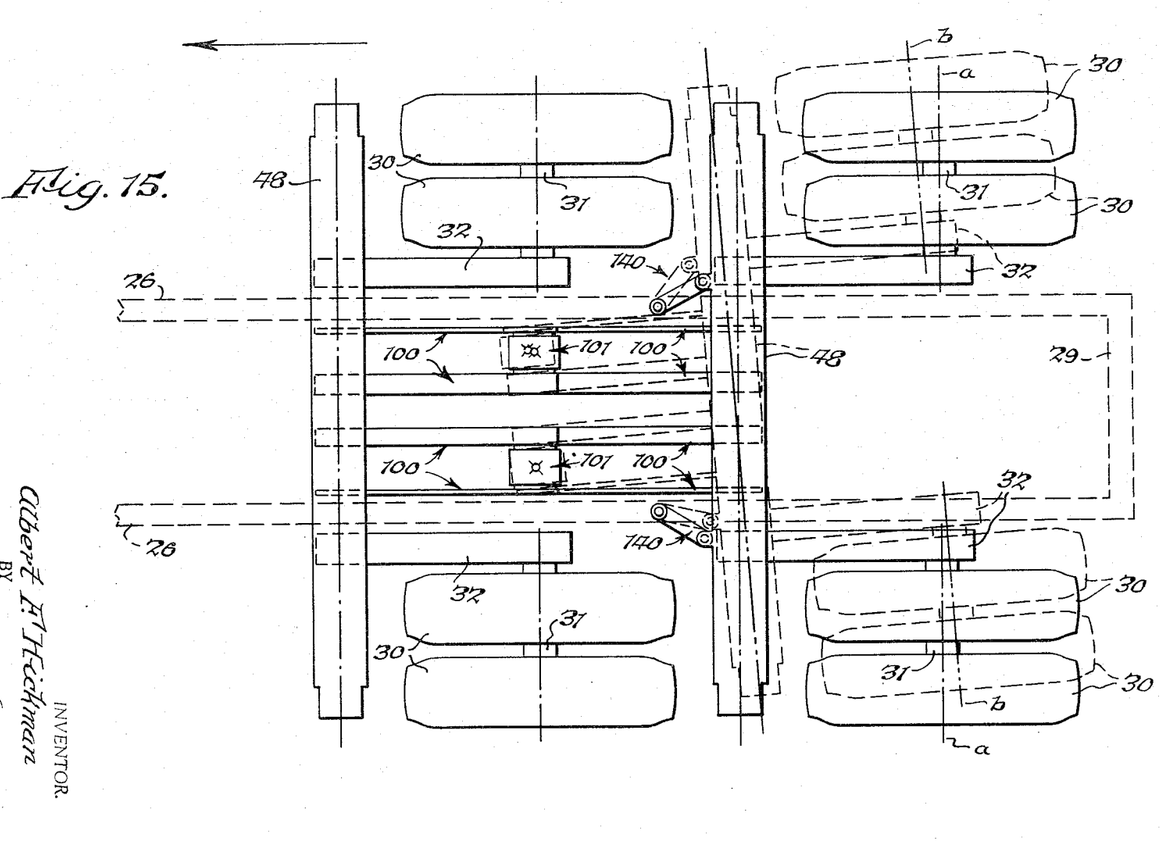
FIG. 15 is a diagrammatic top elevational view of the self-steering form of the invention shown in FIGS. 11–14 and illustrating the manner in which the tandem wheels are self-steering.
Figure 16:
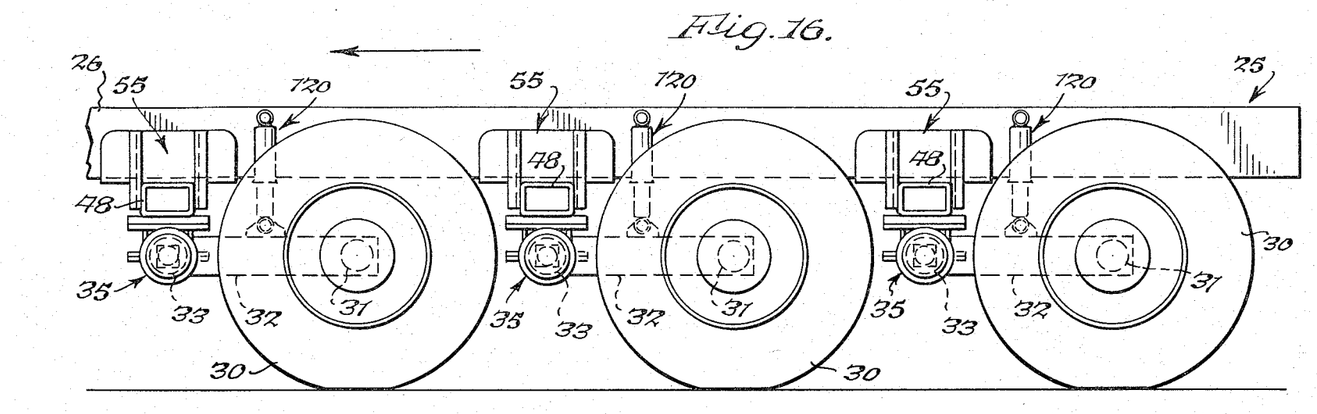
FIG. 16 is a view similar to FIG. 1 showing a modified form of the invention in which the vehicle suspension is in the form of a three tandem wheel suspension.

The pair of toed-in links 140 guide the rear bolster 46 so as to render the rear pair of tandem wheels 30 self-steering when the vehicle is steered from a straight course. Thus when such steering of the vehicle occurs the rear pair of wheels 30 tend to move laterally of the line of movement of the vehicle to avoid the friction of tire scuffing, such lateral movement being permitted by the pair of rubber bodies 135 which support the vehicle frame 25 on opposite ends of the rear bolster 48. However, such movement of the rear bolster 48 and its wheels 30, say, to the right side of the vehicle (or upward movement of the rear bolster and its wheels as illustrated in FIG. 16), causes the right hand link 140 to draw the rear bolster 48 forwardly and the left hand link 140 to push the rear bolster rearwardly, as indicated by broken lines in FIGS. 16. Since the axis of the rear pair of wheels 30 is held in parallelism with the rear bolster 48, the axis of the rear pair of wheels is moved from the normal axis a—a to the steering axis b—b, this causing this rear set of wheels to track around the curve in response to the turning of the vehicle frame 25 when so steering it to the right. Of course, on steering to the left the rear set of tandem wheels, through the action of the links 140, is swung in the opposite direction from the normal transverse axis a—a so as to cause the rear tandem wheels 30 to track properly when so making a lefthand turn. To limit the movement of each rubber supported bolster 48 transversely of the line of movement of the vehicle frame 25, stops 48' are provided on the bolster in position to engage the inside of edges of the main longitudinal side frame bars as best shown in FIG. 12.

Figure 17:
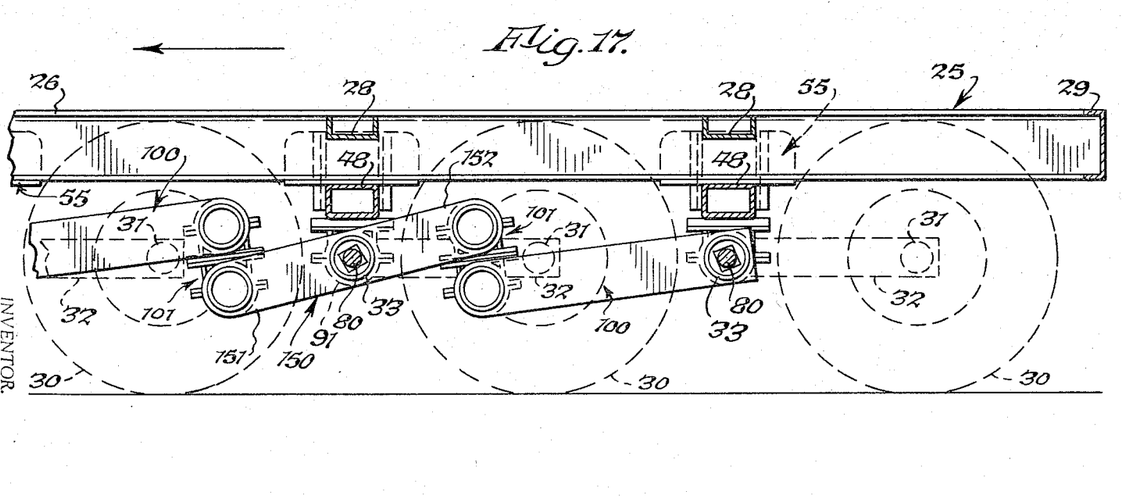
FIG. 17 is a view similar to FIG. 2 illustrating the form of the invention shown in FIG. 16.

*Three tandem wheel suspension—FIGS. 16 and 17*

Figure 5:
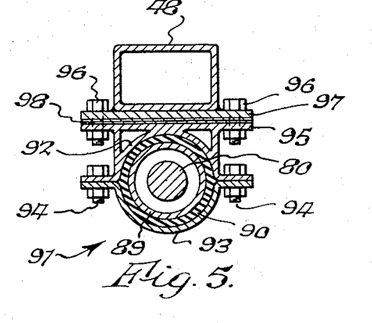
FIGS. 5 and 6 are vertical longitudinal sections taken generally on the correspondingly numbered lines of FIG. 4.

All of the parts used to provide the two tandem wheel suspension shown in FIGS. 1–8 are used in producing the three tandem wheel suspension shown in FIGS. 16 and 17 and hence the same reference numerals have been used and a description of their construction and mounting will not be repeated. This three tandem wheel suspension is distinguished, however, by a different form of compensating arm 150 connecting the suspension for each of the center wheels with the suspensions for the companion front and rear wheels so as to affect load transfer and load equalization among all of the three tandem wheels at each side of the vehicle. This compensating arm 150 is double-ended or in the form of a walking beam, the forward end of which is indicated at 151 and the rear end of which is indicated at 152. This walking beam can be of the same construction as the compensating arms 100 but is journalled at its center on the frame by means of a frame bearing 91 identical to this bearing as illustrated in FIGS. 4 and 5 and containing a torsion bar 80 which provides its share of the resilient resistance of the three tandem wheel suspension and also acts to equalize the load between the front and rear tandem wheels which it connects. The rear end 152 of each walking beam 150 is connected by a shackle 101 to the forward end of the equalizing arm 100 of the corresponding rearmost tandem wheel 30. The forward end 151 of this walking beam 150 is connected by a shackle 101 to the rear end of the equalizing arm 100 of the corresponding foremost wheel 30.

In the operation of the three tandem wheel form of the invention illustrated in FIGS. 16 and 17, the upward movement of say, the foremost wheel 30 at one side of the vehicle effects upward movement of its stub axle 31 to effect corresponding angular upward movement of its arm 32 and a tubular cross shaft 33, such movement being permitted by the rubber bushings 36 and 66 of the bearings 35 and 65 respectively. The angular movement of each tubular cross shaft 33 is transmitted to the outer end of its torsion bar 80 which in turn causes an upward angular movement of its arm 100, thereby through the corresponding shackle 101 effecting an upward movement of the forward end 151 of the walking beam 150.

This angular movement is transmitted through the hub 89 of this walking beam 50 to the inboard end of the corresponding torsion bar 80 and thence through the associated tubular cross shaft 33 to the arm 32 and stub axle 31 of the companion central wheel 30 to exert downward force thereon.

The downward movement of the forward end 151 of the walking beam 150 also effects upward movement of the rear end 152 thereof and hence upward movement of the compensating arm 100 serving the corresponding rearmost wheel 30. This angular movement is transmitted through the hub 89 to the inboard end of the torsion bar 80 serving the rearmost wheel 30 and thence through the companion tubular cross shaft 33 to produce downward pressure against the arm 32 and stub axle 31 of this rearmost wheel 30. This downward force imposed on the arms 32 and stub axles 31 of the center and rearmost wheel 30 distributes the assumed load imposed on the foremost wheel 30 to these two center and rearmost wheels so as to effect load distribution among them. It will also be noted that this load transfer is transmitted through three torsion bars 80 so as to obtain their cumulative resilience.

Figure 18:
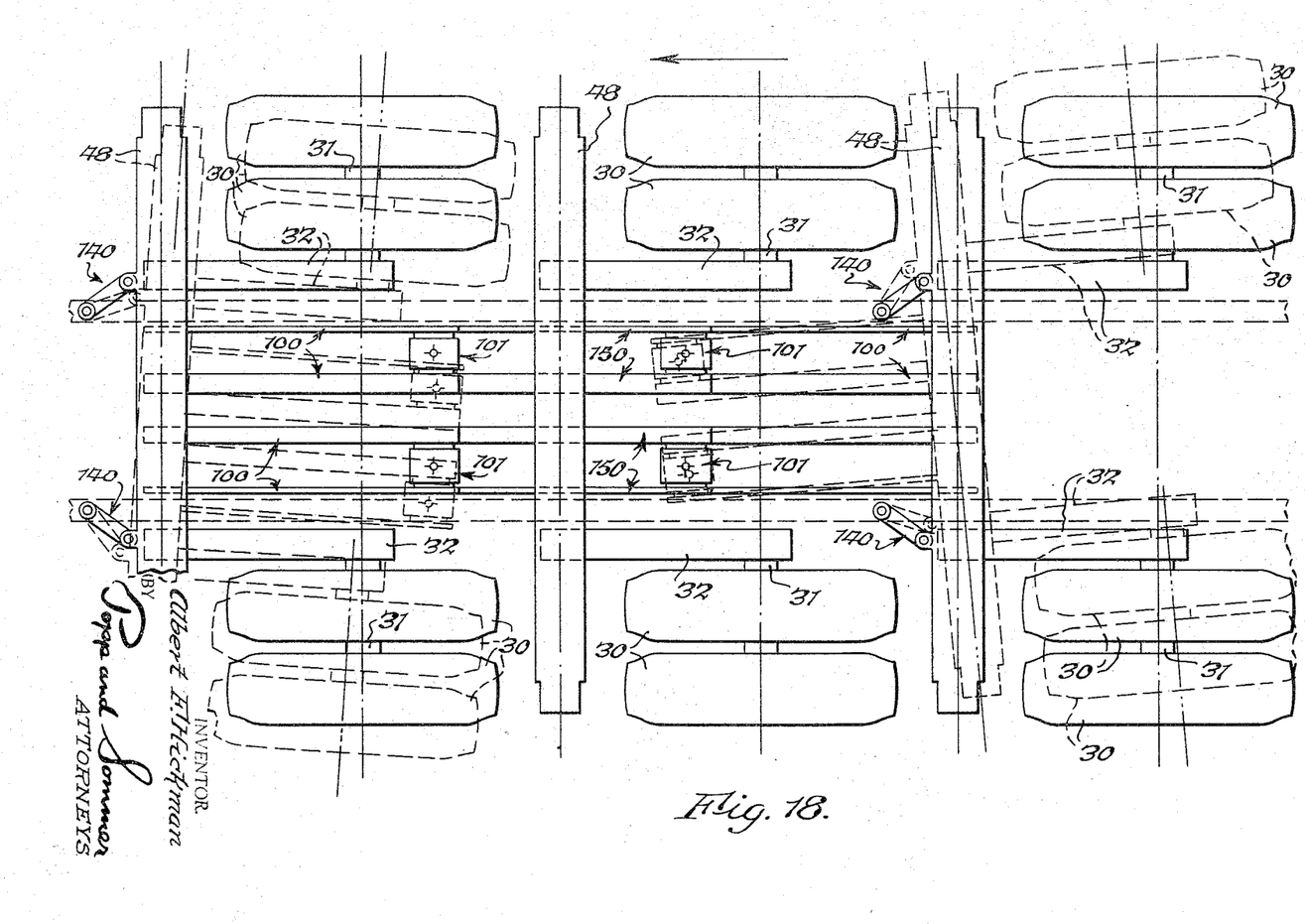
FIG. 18 is a view similar to FIG. 15 illustrating the manner in which self-steering can be embodied in a form of the invention in which the vehicle is supported at one end by three sets of wheels in tandem.

*Self-steering three tandem wheel suspension—FIG. 18*

It is apparent that the three wheel tandem suspension illustrated in FIGS. 16 and 17 can be made self steering by utilizing the rubber mounting and link mechanism illustrated in FIGS. 11–15 between two of the three bolsters 48 and the vehicle frame 25. Preferably, although not necessarily, the center and rearmost bolsters 46 are so rendered self-steering as illustrated in this FIG. 18. Thus the center and rear bolster 48 of the three tandem wheel suspension illustrated in FIG. 18 have each end supported on a horizontal rectilinear movement rubber block 135 in the manner illustrated in FIGS. 11–14 so that each of these bolsters is capable of horizontal movement transversely and lengthwise of the line of movement of the vehicle frame 25. When such movement occurs, due to the frictional resistance in avoiding tire scuffing when rounding a curve on steering into and out of traffic, one end of each of the center and rearmost bolsters 48 is drawn forwardly and the opposite end is pushed rearwardly.

In FIG. 18 is illustrated this action when steering from the straightaway into a righthand turn. As illustrated in broken lines, this causes the links 140 at the righthand side of the vehicle to pull the righthand or starboard ends of the foremost and rearmost bolsters 48 fowardly, and the companion links 140 at the lefthand or port side of the vehicle to push the port ends of these foremost and rearmost bolsters 48 rearwardly. Since the associated wheels 30 are compelled to move with their bolsters 48, this causes the foremost and rearmost sets of wheels 30 to assume the dotted line positions shown in FIGS. 18 so that all of the wheels of the three tandem wheel suspension trail around one another when the vehicle is steered either to the right or to the left thereby not only to avoid tire wear but also to increase gasoline mileage, stability and driving comfort and ease.

Figure 19:
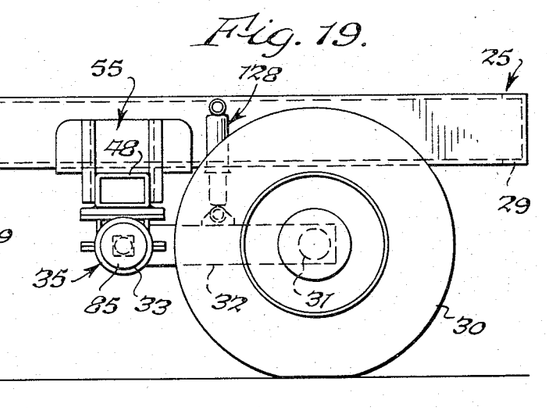
FIG. 19 is a view similar to FIG. 1 showing a further modified form of the invention embodied in a vehicle having its rear end supported by a single pair of wheels.
Figure 20:
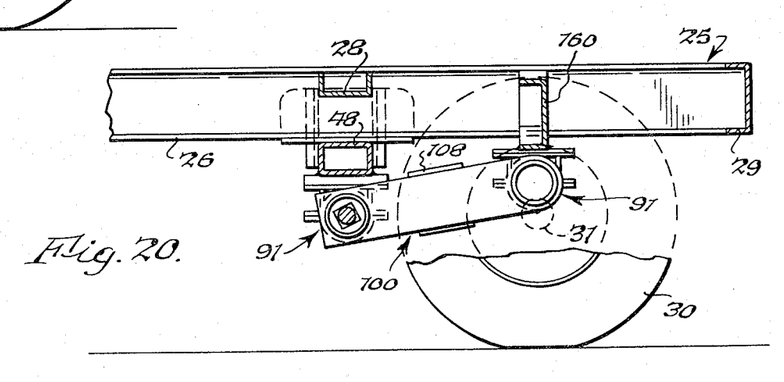
FIG. 20 is a view similar to FIG. 2 illustrating the form of the invention shown in FIG. 19.
Figure 21:
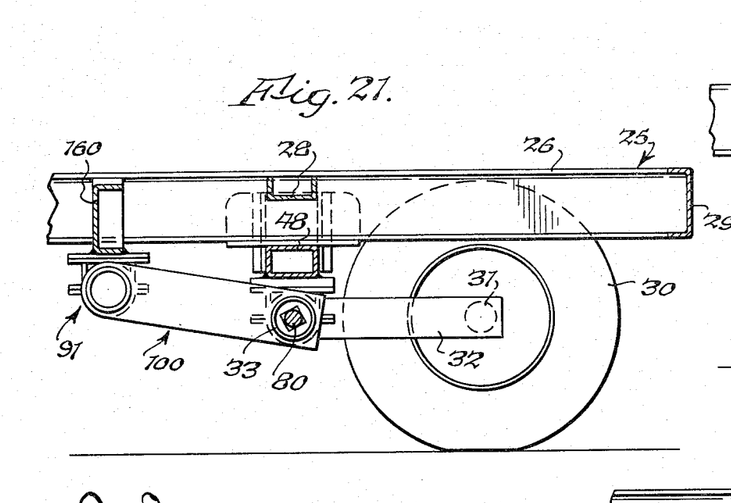
FIG. 21 is a view similar to FIGS. 2 and 13 illustrating a further modified form of the invention in which the one end of the vehicle frame is supported by a single pair of wheels.

*Single wheel suspension—FIGS. 19–21*

It is apparent that the invention can be adapted to a heavy duty vehicle having the rear end of its frame supported at its opposite sides by single wheels in contradistinction with the tandem wheel suspensions previously described. Such forms of the invention are illustrated in FIGS. 19–21 from which it will be particularly noted that the same components are provided in the same relation except that the outboard end of each "compensating" beam 100, instead of connecting with a shackle 101, is connected to a frame bearing 91 which is identical with the bearings 91 in the forms of the invention previously considered and illustrated in detail in FIGS. 4 and 5.

Instead of being fixed, however, to a bolster 48, the bearings 91 are preferably fixed to a cross beam 160 of the vehicle body. The arm 100 as illustrated in FIGS. 19–21 can be either extended rearwardly so as to connect through a bearing 91 to a cross beam 160 (FIGS. 19 and 20) above the axis of the wheel 30, in which case the force exerted by its outboard rear end is upward, or it can extend forwardly away from the axis of its wheel 30, as illustrated in FIG. 21, to a frame cross beam 160 in which case its force against the vehicle frame 25 is downwardly.

It will be particularly noted that this form of the invention uses the same components as all of the other forms thereby not only to provide a distinct manufacturing economy through the use of a large number of identical parts but also to reduce the inventory of dealers throughout the country in stocking replacement parts for vehicles involved in wrecks.

As in the preceding description, in the following claims "wheel" is intended to include the ground engaging wheel means 30 supporting each stub axle regardless whether in the form of a single wheel (not shown) or in the form of the duo-wheel shown.

From the foregoing it will be seen that the present invention achieves the various objects and has the advantages previously set forth and also provides a wide variety of tandem and single axle suspensions which are principally composed of identical and interchangeable parts.

I claim:

1. A vehicle spring suspension adapted to be interposed between a vehicle frame and one end of a first stub axle on which a first wheel having a first rubber tire is journalled to rotate about a generally horizontal axis, comprising a first arm having one end fixed to said stub axle and extending generally in a horizontal direction radially alongside said wheel, a first horizontal cross shaft having a part intermediate its ends fixed to the other end of said first arm and extending generally parallel with the axis of said first wheel, a first bearing adapted to be secured to said vehicle frame and journalling the end of said first cross shaft which is outboard from said first arm with reference to the centerline of the vehicle, a second bearing adapted to be secured to said vehicle frame and journalling the end of said first cross shaft which is inboard from said first arm with reference to the centerline of the vehicle, a first torsion spring means, means fixing one end of said first torsion spring means to said first cross shaft to rotate therewith, a third bearing adapted to be secured to said vehicle frame and journalling the other end of said first torsion spring means, a second arm fixed to and projecting perpendicularly from said other end of said first torsion spring means, a second stub axle arranged generally parallel and in line with said first stub axle lengthwise of the line of movement of the vehicle, a second wheel having a second rubber tire journalled about a generally horizontal axis on said second stub axle, a generally horizontal third arm having one end fixed to said second stub axle and extending generally in a horizontal direction radially alongside said second wheel, a second horizontal cross shaft having a part intermediate its ends fixed to the other end of said third arm and extending generally parallel with the axes of said wheels, a fourth bearing adapted to be secured to said vehicle frame and journalling the end of said second cross shaft which is outboard from said third arm with reference to the centerline of the vehicle, a fifth bearing adapted to be secured to said vehicle frame and journalling the end of said second cross shaft which is inboard with reference to the centerline of the vehicle, a second torsion spring means, means fixing one end of said second torsion spring means to said second cross shaft, a sixth bearing adapted to be secured to said vehicle frame and journalling the other end of said second torsion spring means, a fourth arm fixed to and projecting perpendicularly from said other end of said second torsion spring means toward said second arm, and means connecting the outboard ends of said second and fourth arms to provide load transfer from one of said wheels to the other through both of said torsion spring means.

2. A vehicle spring suspension as set forth in claim 1 wherein each of said cross shafts is tubular and wherein each of said torsion spring means is in the form of a torsion bar having the greater part of its length housed within a corresponding tubular cross shaft.

3. A vehicle spring suspension as set forth in claim 1 wherein said connecting means comprises a shackle.

4. A vehicle spring suspension as set forth in claim 1 additionally including means for adjusting the effective length of said shackle.

5. A vehicle spring suspension as set forth in claim 1 additionally including means for horizontally adjusting the position of each of said first and fourth bearings in the direction of the line of movement of said vehicle frame.

6. A vehicle spring suspension as set forth in claim 1 additionally including means for vertically adjusting the position of each of said first and fourth bearings relative to said vehicle frame.

7. A vehicle spring suspension as set forth in claim 1 wherein said connecting means comprises a third stub axle arranged between and generally parallel with said first mentioned and second stub axles, a third wheel having a third rubber tire journalled on said third stub axle to rotate about a horizontal axis, a generally horizontal fifth arm having one end fixed to said third stub axle and extending generally in a horizontal direction radially alongside of said third wheel, a third horizontal crossshaft having a part intermediate the ends fixed to said other end of said fifth arm and extending generally parallel with the axes of said wheels, a seventh bearing adapted to be secured to said vehicle frame and journalling the end of said third cross shaft which is inboard from said fifth arm with reference to the centerline of the vehicle, a third torsion spring means, means fixing one end of said third torsion spring means to said third cross shaft, an eighth bearing adapted to be secured to said vehicle frame and journalling the other end of said third torsion spring means, a sixth arm fixed to and projecting perpendicularly from said other end of said third torsion spring means toward said second arm shackle means connecting the outboard ends of said sixth and second arms, a seventh arm fixed to and projecting perpendicularly from said other end of said third torsion spring means toward said fourth arm, and shackle means connecting the outboard ends of said fourth and seventh arms to provide load transfer from each wheel to the other two through all three of said torsion spring means.

8. A vehicle spring suspension as set forth in claim 7 wherein each of said cross shafts is tubular and wherein each of said torsion spring means is in the form of a torsion bar having the greater part of its length housed within a corresponding tubular cross shaft.

9. A spring suspension for a vehicle frame, comprising a pair of generally parallel and horizontal stub axles arranged generally in line with each other lengthwise of the line of movement of the vehicle frame, a rubber tired wheel journalled on each stub axle, an arm fixed at one end to each stub axle and extending radially alongside said wheel in a generally horizontal direction, a horizontal tubular cross shaft having a part intermediate its ends fixed to said other end of each of said arms and extending generally parallel with the axes of said wheels, a first bearing adapted to be secured to said vehicle frame and journalling the end of each tubular cross shaft which is outboard from the corresponding arm with reference to the center of the vehicle frame, a second bearing adapted to be secured to said vehicle frame and journalling the end of each cross shaft which is inboard from the corresponding arm with reference to the center of the vehicle frame, a torsion bar extending through each tubular cross shaft and fixed thereto adjacent its said first bearing, and means operative connecting together the opposite ends of said torsion bars to transmit motion from one to the other thereby to effect load transfer between said wheels.

References Cited by the Examiner
UNITED STATES PATENTS

| | | | |
|---|---|---|---|
| 1,964,735 | 7/1934 | Knox et al. | 280—124 |
| 3,147,990 | 9/1964 | Wettstein | 280—124 |
| 3,158,365 | 11/1964 | Peras | 280—124 |

MILTON BUCHLER, *Primary Examiner.*

BENJAMIN HERSH, *Examiner.*

M. S. SALES, *Assistant Examiner.*